United States Patent [19]
Olsen

[11] 3,747,257
[45] July 24, 1973

[54] ADJUSTABLE WEIGHT BOBBER

[76] Inventor: Peter A. Olsen, 1710 Ross Ave., Saint Paul, Minn. 55106

[22] Filed: May 24, 1972

[21] Appl. No.: 256,273

[52] U.S. Cl.............. 43/43.14, 43/44.87, 43/44.92
[51] Int. Cl............................................. A01k 93/00
[58] Field of Search.................. 43/43.14, 44.87, 43/44.92, 44.95

[56] References Cited
UNITED STATES PATENTS

| | | | |
|---|---|---|---|
| 2,726,474 | 12/1955 | Soskice | 43/43.14 |
| 2,761,238 | 9/1956 | Shiverdecker | 43/43.14 |
| 3,037,319 | 6/1962 | Stanek | 43/44.95 |
| 3,664,053 | 5/1972 | Beverly | 43/43.14 |

Primary Examiner—Robert Peshock
Assistant Examiner—Daniel J. Leach
Attorney—Robert M. Dunning

[57] ABSTRACT

A bobber is provided with a hollow interior, and a removable cap. The interior of the bobber may be filled or partially filled with water, sand or other material to provide a desired amount of ballast so that the bobber may be used in casting and will provide the necessary weight for casting light weight lures.

5 Claims, 5 Drawing Figures

PATENTED JUL 24 1973 3,747,257

ADJUSTABLE WEIGHT BOBBER

This invention relates to an improvement in an adjustable weight bobber and deals particularly with a fishing bobber which may be used in various ways.

BACKGROUND OF THE INVENTION

Many forms of bobbers have been produced. These may be of the tilt up type which normally lie flat on the surface of the water and tilt upwardly when the fish bite at the bait, or merely comprise a float which is pulled downwardly beneath the surface of the water when a fish is hooked. In order to be a bobber, the main concern is that the object may be tied upon the fish line, and is capable of floating.

In certain types of fishing, such as fly fishing with very light weight artificial flies, it is desirable to cast the bait or lure for a considerable distance, and to let it either float on the surface, or to be suspended at a short distance below the surface. In order to accomplish this purpose, a bobber is usually required. However, the very light weight of the lure and the light weight of the bobber often make it difficult for the angler to cast the lure the desired distance. It is with this in mind that the present bobber was designed.

SUMMARY OF THE INVENTION

The object of the present invention is to provide a hollow bobber, preferably formed of a material such as a flexible plastic polyolefin or other resilient material which will not readily break in use. This body is provided with a neck which may be externally threaded. A cap is provided for closing the neck and for sealing the interior of the body. With this arrangement, the weight of the body may be readily adjusted by filling the interior of the bobber with water, sand or other material to provide the desired balance. When it is desired to cast the lure a considerable distance, the cap may be removed, and the hollow body may be filled or partially filled with water or other ballast material. When it is desired to fish close to the boat or to the fisherman, the cap may be removed and the ballast emptied so that the device will serve in the normal capacity of the bobber. In other words, the ballast in the bobber may be adjusted so that the bobber barely floats on the surface of the water, or may be removed so that the bobber will float high on the surface of the water when it is so desired.

A further feature of the present invention resides iin the provision of a structure in which in cap serves in the double capacity of a means of inserting and removing ballast from the interior of the bobbin, but also serves as a means of clamping the line in order to suspend the bait or lure at a desired distance from the bobber. The neck of the recepticle is slit, and when the line is inserted through the slit, the fastening of the cap in place will automatically clamp the line to the bobber.

A further feature of the present invention resides in the provision of an elongated body having a neck and a closure cap at one end, and having a line guiding means at the opposite end. As a result, when the line extends through the line guiding means and is clamped in position by the cap, the bobber will normallt float in a generally upright position. However, if preferred, the line may be attached to one end only of the bobber, in which case the bobber may float in a generally horizontal position unless it is too heavily ballasted.

These and other objects and novel features of the present invention will be more clearly and fully set forth in the following specification and claims.

DESCRIPTION OF THE PREFERRED EMBODIMENT

Figure 1:
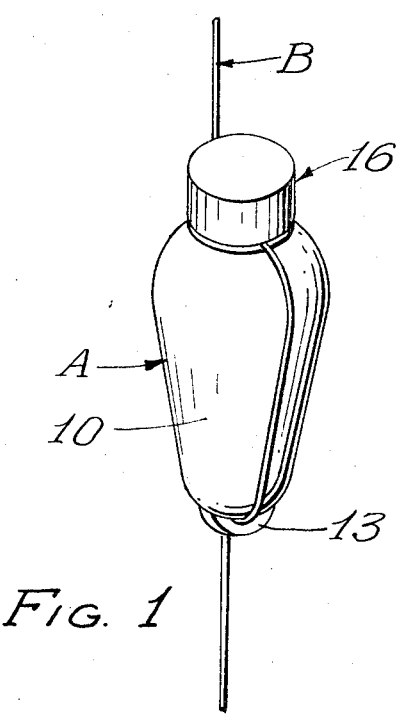
FIG. 1 is a perspective view of the bobber connected to a fishing line.
Figure 2:
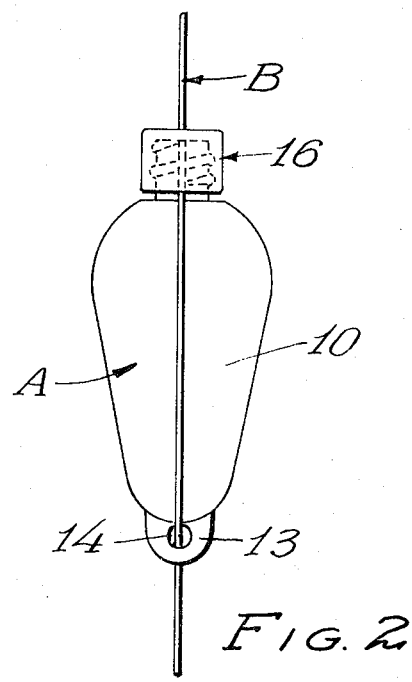
FIG. 2 is a side elevational view of the same.
Figure 3:
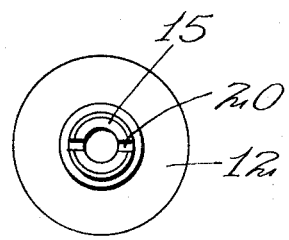
FIG. 3 is a top plan view of the bobber with the cap removed.

While the specific form of construction of the bobber A may be varied, it is shown as having a circular cross-section and having frusto-conical walls 10 which, in the preferred form, teminate in a rounded lower end 11, and a rounded upper end 12. The rounded lower end 11 is provided with a downwardly projecting ear 13 which is apertured as indicated at 14 to accommodate the line B. The rounded upper end is provided with a substantially cylindrical neck 15. The neck 15 may be closed by a cap which is indicated in general by the numeral 16, and includes a top closure 17, and interally threaded cylindrical walls 19. The cap 16 may be threaded upon the neck 15 in order to enclose the interior of the container.

Figure 4:
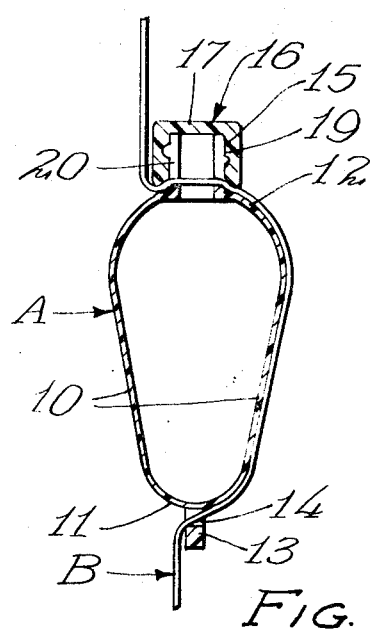
FIG. 4 is a vertical sectional view through the bobber.

As is indicated in FIG. 4 of the drawings, the neck 15 may be longitudinally slotted as indicated at 20 so that the line B may extend through opposite sides of the neck 15 and may be clamped in place by the lower edge of the cap 16. Thus the fish line B may be supported in a desired relation relative to the bobber so as to suspend the bait or lure (not shown in the drawings) a predetermined distance below the surface.

The body of the device is preferably formed of a flexible plastic polyolefin or other material which is quite resilient and which will sustain the shock of being thrown against rocks, trees or other relatively solid objects. As will be noted, the walls of the bobber are thin and resilient. By removing the cap 16, the body may be filled to the desired extent with water, sand or other ballast. When used as a casting bobber for casting bait a considerable distance, the bobber is filled to the extent where it barely floats on the surface of the water. Such an arrangement is desirable, for example, when the bait or lure is cast upon the surface of a stream so that the bait or lure will be suspended at a desired elevation as the bobber slowly floats down the stream. Obviously, it is similarly useful in suspending a bait or lure where the fishermen are in a boat and casting toward shore. Usually the preferred ballast is water, as the bobber may be filled readily to the desired extent, and as the ballast may be readily poured out if found to be excessive.

Figure 5:
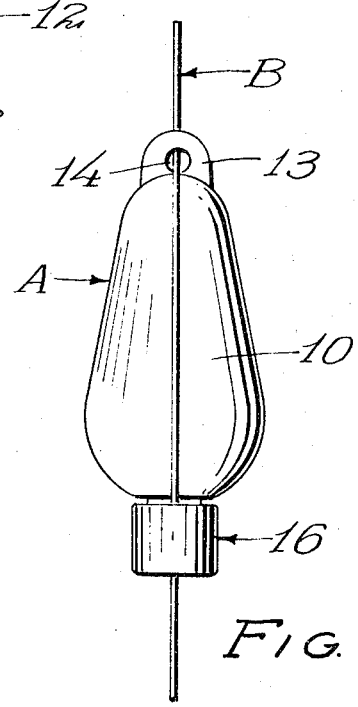
FIG. 5 is a side elevational view of the bobber when used in inverted postion.

FIG. 5 of the drawings is merely indicative of the fact that the lure may, if desired, be used with the cap end of the body extending downwardly instead of upwardly as in the other figures. It is sometimes preferred to have the clamped end of the line nearest to the bait or lure, and this is readily possible as is seen from FIG. 5 of the drawings.

In accordance withe the Patent Office Statutes, I have described the principles of construction and operation of my improvement in an adjustable weight bobber, and while I have endeavored to set forth the best embodiment thereof, I desire to have it understood that changes may be made within the scope of the following claims without departing from the spirit of my invention.

I claim:
1. A bobber including:
a hollow body including a neck portion,
a closure detachably connected to said neck, said closure providing a closure for said neck and a means of containing ballast within the hollow body and fishing line guiding means on said body.
2. The structure of claim 1 and in which said closure comprises a cap detachably secured on said neck.
3. The structure of claim 1 and in which said closure comprises a cap threaded onto said neck.
4. The structure of claim 3 and in which said neck is transversely slotted to accommodate the fishing line adapted to be clamped in place by said cap.
5. The structure of claim 4 and in which said guiding means at the end of said body opposite said neck.

* * * * *